J. W. LYON.
MACHINE FOR FINISHING PLUGS FOR STOP COCKS.
No. 27,370. Patented Mar. 6, 1860.
3 Sheets—Sheet 1.
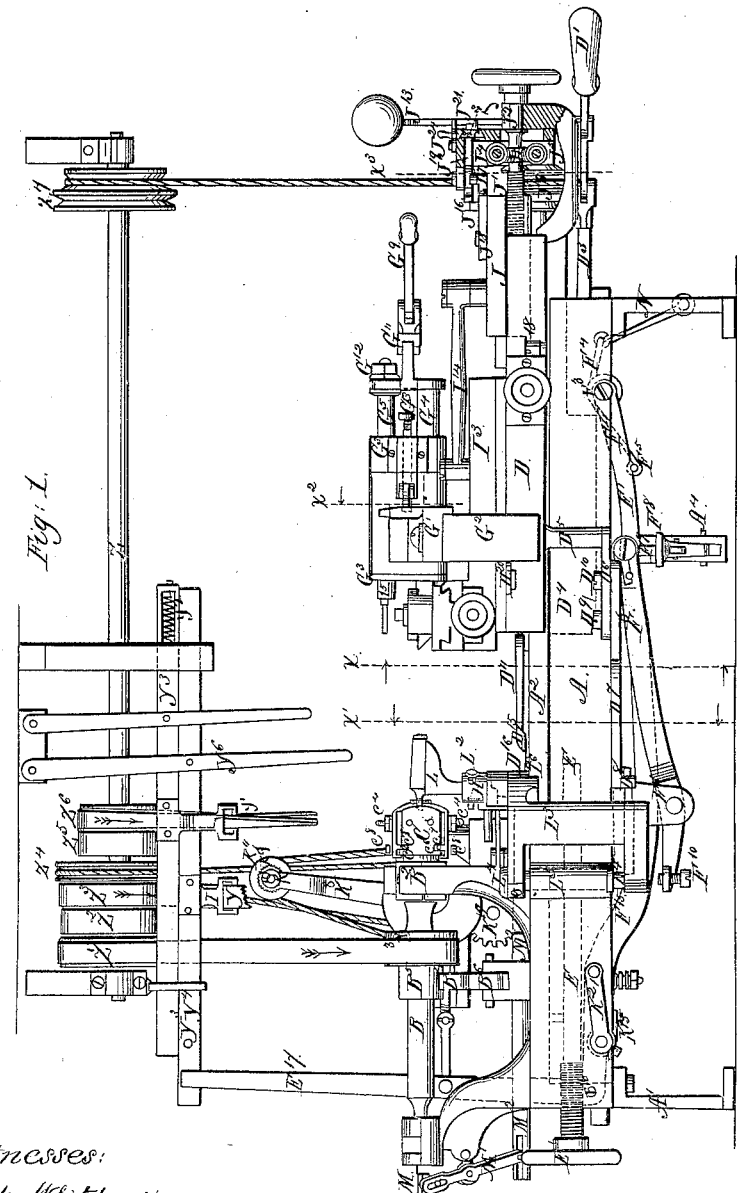
Fig: 1.
Witnesses:
Wm. R. Whitehead
Richard J. Cunningham
Inventor:
Jas. W. Lyon J. W. LYON.
MACHINE FOR FINISHING PLUGS FOR STOP COCKS.
No. 27,370.  Patented Mar. 6, 1860.
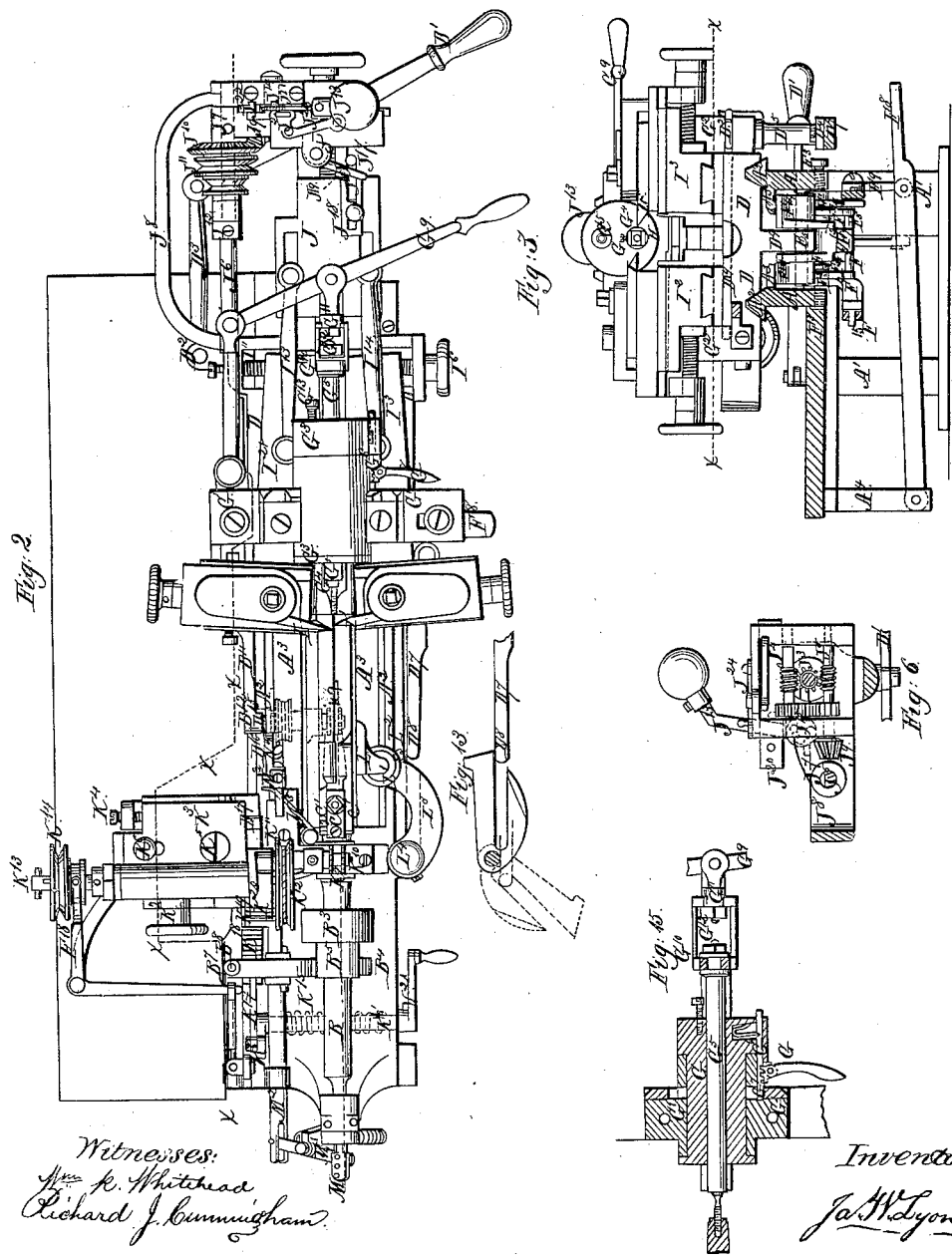

J. W. LYON.
MACHINE FOR FINISHING PLUGS FOR STOP COCKS.
No. 27,370. Patented Mar. 6, 1860.
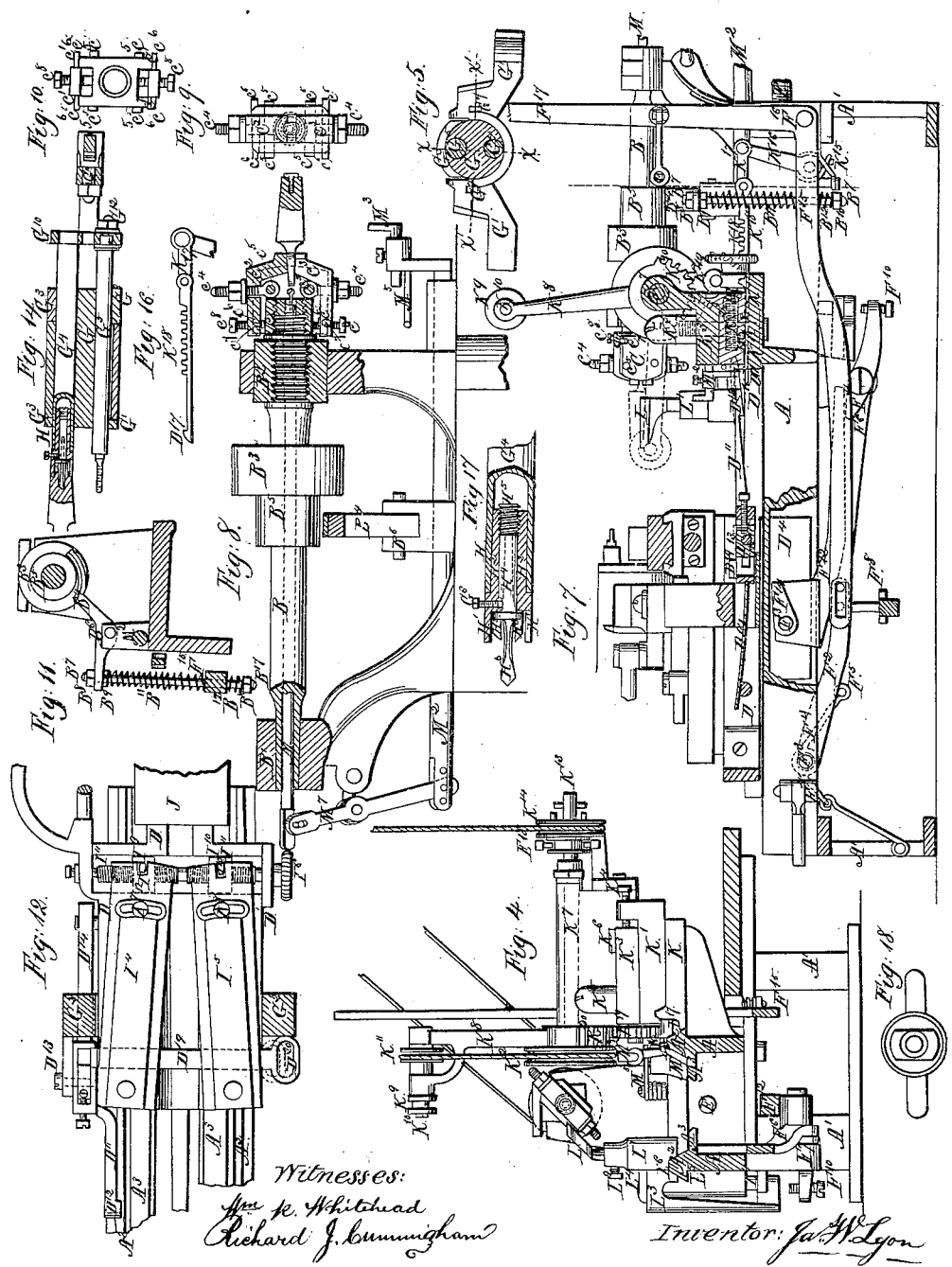

UNITED STATES PATENT OFFICE.

JAMES W. LYON, OF BROOKLYN, NEW YORK.

MACHINE FOR FINISHING PLUGS OF STOP-COCKS.

Specification of Letters Patent No. 27,370, dated March 6, 1860.

*To all whom it may concern:*

Be it known that I, JAMES W. LYON, of the city of Brooklyn, in the county of Kings and State of New York, have invented a new and useful Power-Machine for Finishing Plugs for Stop-Cocks, Swings, &c., Used in Gas-Fixtures and for other Purposes; and I do hereby declare that the following is a full and correct description thereof, reference being had to the annexed drawings, making a part of this specification, and to the letters of reference thereon.

My said machine may be used to advantage in finishing larger plugs and keys, but is more especially adapted to small brass and composition plugs such as are used in gas fixtures. These plugs or keys are cast about the shape and nearly the size required but with sufficient excess of metal to insure a smooth surface when removed by the action of the cutting tools employed in finishing.

The operations necessary to be performed in finishing plugs are, first to cut a shoulder or washer seat on the end of the plug, slightly undercutting it; second to drill and countersink a hole for the washer screw in the end of the plug; third to form an internal screw in said hole; fourth to turn the sides of the plug to a regular taper, so as to fit the hollow conical cylinder in the barrel destined to receive it; and fifth to cut a flat on one or opposite sides of the part of the plug inclosed by the washer, to fit a D or an O shaped washer.

My said machine consists of a spindle and chuck suitable for holding the plug, mounted in the head stock of a turning lathe and so arranged with relation to the motive power as to be capable of being rotated in opposite directions or held in a fixed position by a brake when required, in combination with several separately organized groups of mechanical devices, which hold and guide, and some of which automatically move, cutting tools against the blank plug in a previously determined and proper path to perform the several operations above described, as they are successfully brought into action by the operator, who, after the line of travel of the different cutting tools is once adjusted for the sized plug required, may repeat the operations of the machine upon any number of plugs of the same size, without further exercise of skill than is necessary to chuck the blank plugs properly, and to bring into action successively the several tools. There is in combination with the machine a hinged hand rest suitable for hand tools, which are subsequently used as hereinafter described, also to assist the operator in chucking the blank plug. There is also a sliding mandrel which occupies the axis of the spindle and carries a small drill the office of which is to mark a center on the end of the thumb piece of the plug, if it is to be removed before grinding to its seat.

Figure No. 1 of the drawings represents a front elevation of the machine; Fig. No. 2, a plan view; Fig. No. 3, transverse section through red line X Fig. No. 1; Fig. No. 4, transverse section through red line $X^1$ Fig. No. 1; Fig. No. 5, transverse section through red line $X^2$ Fig. No. 1; Fig. No. 6, transverse section through red line $X^3$, Fig. No. 1; Fig. No. 7, rear elevation of part of the machine showing a vertical longitudinal section through the red line X Fig. No. 2; Fig. No. 8, detached view of spindle chuck center drill and friction brake; Fig. No. 9, front end view of chuck; Fig. No. 10, back end view of chuck; Fig. No. 11, transverse section of spindle, brake and adjustable springs on connections; Fig. No. 12, horizontal section through red line X Fig. No. 3 showing the mode of adjusting the two slide rests by a right and left threaded screw common to both; Fig. No. 13 detached view of movement for throwing out the hinged hand rest; Fig. No. 14, section through red line X Fig. 5 showing reversible mandrel stock with parallel mandrels carrying tools for forming the washer seat and drilling and tapping the screw hole in the end of the plug. Fig. No. 15, section through red line $X^1$ Fig. 5 showing mode of latching and reversing the position of mandrel stock and mandrels; Fig. No. 16, detached side view of toothed rack for moving the vibrating cutter arm; Fig. No. 17, detached view of compound cutting tool for the end of the plug, showing its construction and mode of adjustment; Fig. No. 18, detached end view of finished plug or key.

The first part of my invention relates to the spindle, represented in the drawings by the letter B. It is mounted on heads cast on the end of the bed or sheers A, which is supported by legs $A^1$ which also support a table behind the machine. It is necessary in turning brass or soft metal to rotate the spindle with considerable velocity which frequently causes it to bind in its bearings owing to longitudinal expansion caused by the heat consequent upon the friction produced by rapid motion when constructed in the ordinary manner with taper main bearing and tail screw.

In order to insure steadiness of motion sufficient for the purpose of my machine, and at the same time sufficient stiffness in the spindle to stand the shock of the sudden arrest by the brake to which it is constantly subjected, it is necessary to make the spindle considerably longer and heavier than is customary in turning lathes for small turning, which would increase the difficulty occasioned by expansion produced by friction if I followed the ordinary form of construction and this part of my said invention consists in dispensing with either shoulder or tail screw on the inferior bearing $B^1$, which I do not confine longitudinally in any manner, and in connection therewith constructing the main bearing surfaces $B^2$ entirely of sharp edged and bottomed W grooves fitted to reverse W grooves in the bearing box. This part of the spindle should be of hardened steel, the bearing boxes of brass or composition. A bearing formed in this manner does not wear loose, is incapable of longitudinal motion and will not bind when heated.

Letter $B^3$ represents a pulley by which the spindle is rotated by a belt from the pulley $Z'$ fast to the countershaft Z.

The second part of my invention consists in combining with the spindle, and lever $F^{15}$ operating the belt shipper a friction brake $B^4$ which takes against the face of the spindle pulley $B^5$ at two different times and for two different purposes, viz, first—to arrest the motion of the spindle, and hold it until the tools carried by the sliding carriage are brought forward to their place of action in order that they may not be injured by error in chucking the plug, and second, to hold the spindle in a fixed position when the rotating cutters are brought against the side of the shoulder on the plug to cut the flat for the washer, by the backward movement of the sliding carriage. The brake moves freely in a confined fulcrum at $B^6$, and is connected by a vertical rod $B^7$ to the horizontal part of the long crooked lever $F^{15}$ which operates the belt shipper. The upper end of this rod has a screw thread cut on it and passed through a hole in the end of the lever brake, which it loosely fits, and is confined thereto by screw nuts $B^8$ $B^9$ above and below the hole. The lower end of the rod passes down through a hole in the lever $F^{15}$ a short distance below it and terminates with a screw and nut.

$B^{10}$, $B^{11}$ and $B^{12}$ are helical springs surrounding the rod $B^7$ above and below the lever $F^{15}$ and adjustable by the screw nuts $B^9$ $B^{10}$ so as to make yielding pressure on each side of the lever. The effect of this mode of connecting the brake is to insure certainty of action of the brake which would otherwise be uncertain on account of wear in the joints of the levers connecting to the treadle, and also to apply a yielding pressure to the spindle so as not to arrest it too suddenly.

The third part of my invention consists in certain improvements in the chuck, C, for the purpose of adjusting the grasping surface of the jaw pieces to accommodate the surfaces of the thumb pieces of the plugs to be held, which are not of equal thickness but generally taper from the shank and vary in that respect in different patterns. The chuck is composed of a chunk of iron or steel of sufficient size to contain an internal screw, $c$, by which it is attached to the spindle and having parallel projecting flanches, $C^1$, on two sides and extending from the front end forming a recess to which the jaw pieces $C^2$, $C^3$, are fitted. The jaws are clamped together by the screws and nuts $C^4$, $C^4$, the screws pass through holes in the jaw pieces and are jointed to the chuck at $C^5$ $C^5$. This part of my said invention consists in substituting for and in place of the usual joints connecting the jaw pieces with the back part of the chuck—the four pins $C^6$, in the jaw pieces, and four slots $C^7$ in the flanches of the chuck and in combination therewith two adjusting screws $C^8$, one in each jaw piece, the points of the screws taking against the bottom of the recess on each side of the chuck. The pins and slots prevent longitudinal motion of the jaw pieces and yet permit them to be moved out from the back end of the recess far enough to adjust the grasping surfaces of the jaws to all ordinary variations in the shape of the keys or plugs to be held in the chuck. If the thumb pieces are of ornamental character dies may be fitted in the jaws of the chuck as usual.

The fourth part of my invention consists in the arrangement, in combination with the machine, of the sliding carriage D, and its adjustable stop E. The sliding carriage rests and slides longitudinally on the parallel V flanches $A^2$ on the bed of the machine which fit corresponding grooves in the under side of the carriage. It is moved by the hand lever $D^1$, which is connected to the under side of the projecting end of the carriage by a stud pin and joint the fulcrum being connected to a stud $D^2$, on the back side of the bed A by the jointed connection, $D^3$.

$D^4$, is a longitudinal rib or flanch projecting downward from the middle of the under side of the sliding carriage between the horizontal flanches, $A^3$ which project inwardly from the sides of the main frame or bed of the machine.

Letter E, is the adjustable stop for the sliding carriage. It consists of a round bar or shaft screwed into the end of the machine just under the back head and between the sides of the frame or bed and projecting horizontally forward beyond the chuck.

E' is a hand wheel on the screw end of the bar by which it is turned for the purpose of adjustment.

In the operation of the machine after the plug is chucked the sliding carriage sustaining the cutting tools is moved forward by the hand lever until it is arrested by the contact of the front end of the flanch $D^4$ with the end of the adjustable stop E. It must therefore be so adjusted with relation to the length of the plug to be finished that when the carirage is arrested the cutting tool, sustained by it shall be in a proper position to be brought into action.

$D^5$ is a stud projecting downward from the front side of the sliding carriage, and which sustains a horizontal arm $D^6$ to which is attached the adjustable arm $D^7$ on the end of which is a cam pin $D^8$ fitted to the cam slot in the bottom of the swinging frame of hinged hand rest. The adjustable arm should be so adjusted by means of the screws $D^9$ $D^{10}$ which pass through a slot in the arm $D^6$, that when the sliding carriage is moved forward, the cam pin $D^8$ will reach the back end of the cam slot in the hinged hand rest in time to move it out of the way of the cutting tools supported by the sliding carriage. When the sliding carriage moves backward the cam pin takes against the side of the cam slot and brings back the hinged hand rest to its place. A detached view of this motion is shown at Fig. No. 13. To the back side of the sliding carriage is attached another adjustable arm $D^{11}$, which terminates in a hook $D^{12}$. This arm is connected to the sliding carriage by an adjustable fulcrum at $D^{13}$, on which it moves freely. The hook end of the arm is pressed down by the action of the spring $D^{14}$, attached to the other end so that a small cam $D^{15}$, on the side of the hook end bears on the V flanch of the main bed; and when the sliding carriage is moved forward, encounters a small inclined plane $D^{16}$, which it runs over, the hook continuing to be moved forward by the carriage encounters the cam shaped hook or tooth $D^{17}$, on the end of the toothed rack, $K^{18}$, which actuates the vibrating cutter arm and raises over and latches with it just before the termination of the forward movement of the sliding carriage. When the carriage is moved back the toothed rack is drawn by the hook sufficiently far to bring down the rotating cutters of the vibrating arm against the shoulder of the plug to cut the flat and is then released by the cam $D^{15}$, encountering the inclined plane $D^{16}$, which unlatches the hook from the toothed rack which is immediately reacted by a spring so that when the carriage has reached the end of its backward motion the vibrating cutter arm has returned to its normal position, the hinged hand rest at the same time being swung into its place by the front adjustable arm. The extent of the backward motion of the sliding carriage is determined by a permanent stop $D^{18}$ which is a screw projecting from the main bed.

$D^{19}$ is a latch furnished with a handle $D^{20}$.

It is shoved back over the arm $D^{11}$ when for any reason it is necessary to keep the hook end up.

From the above description it will be perceived that the sliding carriage as arranged in combination with the machine is a very important element in its organization.

In order to insure the proper action of the cutting tools sustained by the sliding carriage, it is necessary that it should be carefully fitted to its sides on the main bed, so that the vertical and horizontal plane of its motion shall be parallel with the vertical and horizontal plane of the axis of the rotating spindle. It is also necessary to clamp it firmly to the main bed when the cutting tools supported by it are in action. This is accomplished together with other things by the fifth part of my invention, which I will now proceed to describe.

The fifth part of my invention consists in the arrangement in combination with the machine, of a system of levers, connected with and controlled antagonistically by a spring and foot treadle, and which release, and confine the sliding carriage, raise and lower the hinged hand rest, arrest the motion of the spindle by acting on the brake, and at the same time shift the driving belt from a tight to a loose pulley on the counter shaft, and also at the same time connect motive power with the rotating cutters, simply by the down movement of the treadle by pressure of the operator's foot at the time when it becomes necessary in the operation of the machine to move the sliding carriage either backward or forward, and the reaction of the spring consequent upon the release of the treadle from pressure.

Letters $F^1$, $F^2$, are two arms fast to a shaft F which is supported on centers at each end by the points of the screws, $F^3$, $F^3$, in opposite sides of the main bed.

$F^4$ is a spring composed of a double wire the loop end of which secured by a link to a pin on the leg $A^1$, and both members of the spring bent once around the shaft F and the projecting ends attached to a transverse bar, F⁵ which by the action of the spring is pressed up against the arms F¹ F² and the shaft F moving freely on the centers the opeartion of the spring is to raise the arms F¹ F². The front arm F¹ is connected by a pin and slot with the lever, F⁶, which moves freely on its fucrum at F⁷. At the point where the lever F⁶ connects with the arm F¹ is a pin on the end of the lever F⁶ which connects it with the treadle F⁸ by a jointed connection rod F⁹. The fulcrum of the treadle is a pin in the leg A⁴. The other end of the lever beyond the fulcrum is bent frontward and is provided with an adjustable vertical screw. F¹⁰ which points upward and when the treadle is depressed takes against the swinging frame of the hinged hand rest at the axis thereof, and raises it up from the V side on the main bed, and supports it there so that it can be thrown out and back by the pin on the end of the adjustable arm, D⁷, attached to the sliding carriage.

On the lever F⁶ is a cam F¹¹ which is pressed up against the lower side of the lever F¹² by the action of the spring F⁴ on the arm F¹. The other end of the lever bends up and is shaped so as to embrace the flanch, D⁴, and is jointed to it by the pin F¹³. There are two cam shaped lugs F¹⁴ fast to this lever one on each side of the flanch D⁴, which bite against the underside of the flanches A³ on the main bed, and clamp the sliding carriage firmly to the bed when the other end of the lever is acted on by the cam F¹¹, which is always the case except when the treadle is pressed down to release it so that it may be moved forward or backward, the lower side of the lever F¹² being straight and of sufficient length to allow of moving the carriage the requisite distance, and always remain in contact with the cam, so as to be acted on by it when the treadle is released. The sliding carriage is thus held firmly on the bed except when necessary to move it.

The arm F² connects by a slot and pin with the long crooked lever F¹⁵ which moves freely on a stationary fulcrum at F¹⁶ and has a vertical arm F¹⁷ which extends upward to the belt shipper. This arm connects by a jointed connecting rod with the clutch lever F¹⁸ which throws in gear the grooved pulley on the cutting engine. The lever F¹⁵ also connects with the brake B⁴ by the rod B⁷ and adjustable springs as before described.

The sixth part of my invention relates to the means of holding and guiding and moving the cutting tool and tap employed to form the washer seat and screw hole at the end of the plug. It consists in the arrangement or combination with the spindle and chuck; and sliding carriage, of a pair of parallel sliding mandrels, one of which holds the cutting tool, and the other the tap, and both slide horizontally in a cylindrical mandrel-stock supported by the sliding carriage and are so arranged that by turning the mandrel-stock 180° either of the mandrels is brought in line with the axis of the spindle.

Letter G is a horizontal mandrel-stock of cylindrical form fitted to bearings in the pillow block or saddle G¹ which is supported and held by standards G² G² on the sliding carriage. It turns freely in the bearing and is prevented from moving longitudinally by the shoulders G³ at each end of the bearing. It contains two sliding mandrels G⁴, G⁵, the axis of both of which are parallel to the axis of the mandrel-stock, equidistant from it and 180° from each other and so arranged that the axis of either mandrel can be brought in line with the axis of the rotating spindle by turning the mandrel-stock 180° and the mandrel-stock secured in such position by the spring latch G⁶ on the side of the mandrel-stock which slides into a recess G⁷ provided for it in the bearing block on each side. The latch is thrown back by a hand lever G⁸ on which is a short toothed segment which takes in a toothed rack on the latch. This hand lever is also used to turn the mandrel stock from the one position to the other. Both mandrels are connected to each other, and with the hand lever G⁹ by a cross head G¹⁰ and swivel G¹¹.

The mandrel G⁴ carrying the cutting tool H is riveted or keyed to the cross head or in any other manner prevented from turning in its bearing, but the mandrel G⁵ which carries the tap is prevented from turning only by the friction of the collar and washer caused by pressure of the screw nut G¹². The friction should be sufficient to hold the mandrel and tap while forming the internal screw in the end of the plug and yet permit the mandrel to turn when the operation is completed so as to avoid stripping the screw thread formed in the plug or breaking the tap before the motion of the mandrel carrying the plug can be arrested and reversed to withdraw the tap from the plug. The terminus of the forward motion of both mandrels is regulated by an adjustable stop G¹³ which consists of a screw projecting from the end of the mandrel stock and against which the cross head strikes when moved forward by the hand lever.

The cutting tool H on the mandrel G⁴ performs by one forward movement of the mandrel the office of forming the shoulder, slightly undercutting it, and also drills and countersinks the screw hole.

The seventh part of my invention relates to the cutting tool H and consists in the mode of arranging and adjusting its several parts to compensate for unequal wear of the cutting surface. The tool is shown attached to the mandrel and operating on the end of the plug in Fig. 14. Fig. 17 is a larger view of the tool and end of mandrel.

Letters $H^1$ $H^1$ represent two cutters projecting from two opposite sides of a square shoulder formed on the end of a hollow stem $H^2$ fitted tightly to the socket in the end of the mandrel. These cutters are equidistant from the axis of the mandrel, and the cutting edge slightly beveled from inside to outside.

$H^3$ $H^3$ are two shorter cutters between the cutters $H^1$ $H^1$ formed on opposite sides of the end of a small hollow stem $H^4$ which is fitted to and is contained within the hollow stem $H^2$ and is adjustable by the screw plug $H^5$ in the end of $H^2$. The cutting edges of the cutters $H^3$ $H^3$ are also beveled to form the countersink for the screw hole. The hollow stem $H^4$ receives and holds the drill $H^6$ which forms the screw hole in the plug. A part of the side of the hollow stem $H^4$ is cut away so as to expose the side of the drill stem to the action of the end of the binding screw $G^6$ which holds both in place when adjusted.

The object of constructing this tool in separate and adjustable parts is to readily sharpen and readjust the cutting surfaces which wear unequally. The tool not being adjustable to different sized plugs there must of course be a tool for each different sized plug.

The eighth part of my invention relates to the mode of forming the taper part of the plug, and consists in combining with the sliding carriage and spindle, a pair of slide rests which have a means of adjustment of their line of travel common to both, and acting equally upon each and are so arranged as to sustain, guide and move cutting tools one on each side of the plug, automatically, in the proper line of travel to form a perfect taper, by one forward and backward movement when set in motion by the operator, and then stop by self acting mechanism, until set in motion again by the operator to form the taper sides of another plug.

Letters I, $I^1$, represent the cutting tools which form the taper of the plug. They are held, guided and moved by the slide rests $I^2$ $I^3$ in lines equally diverging from the line of the axis of the rotating spindle and plug, and in the horizontal plane of the axis of the spindle. These tools act on the plug at nearly opposite points, the point of the tool $I^1$ being just the width of the cut behind. As it moves forward, and is set a little farther in so as to take a following and smoother cut, the tool I taking the first or heavy cut, which causes the plug to spring down slightly, notwithstanding the support of the tool $I^1$, so that on the return or backward movement of the tools, the tool $I^1$ takes a very fine or finishing cut without the necessity of readjustment for that purpose, the spring of the plug being sufficient. The taper is thus formed and turned by the forward and back motion, or in other words by one operation of this part of the machine. The slide rests $I^2$ $I^3$ used for this purpose are peculiar in some respects, first, they have very long bearings in proportion to the distance they are required to be moved; second, they slide on beds $I^4$ $I^5$ which each are jointed to the sliding carriage at the front end, and have in common an adjusting screw $I^6$ with a right and left thread on it, by which the back ends both are moved an equal distance in opposite directions, so that the line of travel of each cutting tool will equally diverge from the line of the axis of the spindle; third, in being both moved by self acting mechanism, which stops at the end of one forward and backward motion.

The back ends of the beds $I^4$, $I^5$, are confined to the sliding carriage by the screws $I^7$, $I^8$, in segmental slots, which prevent the adjustment. The adjusting screw $I^6$ acts on screw boxes $I^9$, $I^{10}$, in the recess $I^{11}$, which boxes connect with slots in the end of the beds $I^4$, $I^5$ by the pins $I^{12}$ $I^{12}$. The slide rests are connected by adjustable connecting rods $I^{13}$, $I^{14}$, with a sliding bed J on the projecting end of the sliding carriage; on the under side of the bed J is a beveled slide, fitting corresponding guides in the sliding carriage and containing an internal screw fitted to the screw $J^1$ which is supported by and turns in a bearing $J^2$, at the extreme end of the projecting frame of the sliding carriage, and is provided with a hand wheel by which it may be turned, when required, by hand.

The self acting mechanism for moving the screw in reversed directions and stopping itself may be varied. I use that shown in the drawings—viz, letter $J^3$, is a worm wheel fast to the screw shaft $J^1$, which is driven alternately by the worms on the small shafts $J^4$, $J^5$, which run in bearings in the small frame shown detached in Fig. 6, which is made fast to the shaft, $J^6$, by the coupling arm and screw $J^7$, which shaft ($J^6$) oscillates in bearings at each end, within the bowframe, $J^8$. The worm shafts $J^4$, $J^5$, are coupled together by cog wheels with an intermediate wheel interposed between them, so that both worms move in the same direction, and being arranged to take on opposite diameters of the periphery of the worm wheel, when alternately engaged with it, move it, and the slide rests in opposite directions.

When the worm shafts are held in a horizontal position both worms are free of the worm wheel, the distance between the worms being greater than the diameter of the worm wheels. The worms are driven by a pair of bevel wheels $J^9$, $J^{10}$, the smallest one, $J^9$, fast to lower worm shaft, and the larger fast to the V, grooved pulley, $J^{11}$, which runs loose on the shaft, $J^6$, and is kept in place by the collar $J^{12}$, and is driven by a round band from a corresponding V groove pulley on the countershaft overhead.

$J^{13}$, is a bent lever with a heavy ball on the end, the other end being fast to a fulcrum pin which turns freely in the bearing $J^{14}$. On the side of the ball lever next the frame containing the worm shafts is an eccentric cam groove $J^{15}$, in combination with a pin on the frame.

$J^{16}$ is a stationary pin, on the sliding bed J, and $J^{17}$, is a pin adjustable by the slide and screw $J^{18}$. Between these pins is one end of a bent lever $J^{19}$, the other end taking into a slot on the sliding bar $J^{20}$ on the other side of the frame, from which sliding bar project two pins $J^{21}$, $J^{22}$, one on each side of the ball lever.

$J^{24}$, is merely a latch to hold the ball lever, and thereby the worm frame in a horizontal position, when necessary to move the screw shaft by hand. When the slide rests are to be put in motion, the latch is disengaged, the ball lever thrown back which by means of the cam groove and pin raises the frame and engages the lower worm with the worm wheel on the screw shaft and moves forward the sliding bed J connected with the slide rests. When the sliding bed J has moved sufficiently far forward the pin $J^{17}$ made adjustable for that purpose takes against the bent lever $J^{19}$ which brings the back pin $J^{21}$ on the sliding bar $J^{20}$ against the ball lever and throws it forward sufficiently beyond its center of gravity to cause it to fall forward which brings down the frame and engages the upper worm with the worm wheel, and reverses the rotation of the screw shaft causing the sliding bed J and the slide rests to move back and when they have reached about the end of the backward motion, the stationary pin $J^{16}$ on the bed J, takes against the bent lever $J^{19}$, which brings the front pin $J^{22}$, on the sliding bar, $J^{20}$, against the ball lever and lifts it up sufficiently to disengage the worm from the worm wheel on the screw shaft, when the motion of course stops, and the ball lever is supported in that position until the next operation, when the ball lever is again thrown back by the operator and the lower worm engaged with the worm wheel as before. The slide rests may be fed up by a hand lever attached to the bed, J, or by the hand wheel on the screw shaft, but I prefer in all cases an automatic feed for both forward and backward motion on account of its regularity.

The ninth part of my invention relates to the mode of cutting the flat upon the washer seat. This may be done by cutting away a portion of the side of that part of the end of the plug inclosed by the washer, or a portion of both sides. I prefer the latter, as represented in Fig. No. 18. This part of my said invention consists in the arrangement in combination with the spindle and chuck, and friction brake, and belt shipper, of a rotating cutter or cutters sustained by and brought to their place of action by a vibrating arm which is moved at the proper time by the backward movement of the sliding carriage, and held at other times in a vertical position behind the head stock, and out of the way of the cutting tools.

Letter K represents a horizontal bed projecting back from the main bed and cast on it, on its face is a V guide parallel with the spindle which fits a corresponding V groove in the underside of the sliding bed $K^1$, which is provided with a screw and hand wheel $K^2$, for adjusting it. On the upper side of this bed is a V guide (transverse to the V guide on the bed below) which is fitted to a corresponding groove in the upper sliding bed $K^3$ also provided with an adjusting screw $K^4$. When properly adjusted the two sliding beds are held firmly down to the bed K by the screw bolts and nuts $K^5$, $K^6$. On the upper sliding bed is cast a standard, the upper part of which is a long bearing, in which oscillates a hollow shaft $K^7$, on the end of which is the vibrating arm or crank, $K^8$, which sustains a pair of rotating cutter wheels $K^9$ on a small shaft $K^{10}$ driven by the V grooved pulley $K^{11}$, or which connects by a round belt with the large V groove pulley, $K^{12}$, fast to the shaft, $K^{13}$, which runs in the hollow shaft, $K^7$, and projects from the back end of it, and is driven by a clutch V grooved pulley, $K^{14}$, which is connected by a round half cross band to the V grooved pulley, $Z^4$, which is fast to the loose pulley, $Z^3$ on the countershaft overhead.

The vibrating arm or crank is maintained in a vertical position when not required to move by the action of the spring, $K^{15}$, which is coiled around the crank shaft $K^{16}$, one end of the spring being fastened to the shaft and the other attached to a pin screwed in the underside of the main bed. On the rear end of this crank shaft is the crank, $K^{16}$, which connects by a jointed connecting rod, $K^{17}$, with the toothed rack, $K^{18}$ which slides on the face of the bed K, and gears with the pinion cog wheel $K^{19}$, which gears with a segment toothed wheel $K^{20}$, on the periphery of the hub of the vibrating arm—$K^{21}$, is a crank, with a handle, on the front end of the crank shaft $K^{16}$, by which the cutter arm may be brought down by hand when necessary. The mode by which the toothed rack is hooked and drawn forward to bring down the vibrating cutter arm has been before explained in connection with the sliding carriage. The position of the vibrating arm and cutters when acting on the end of the plug is shown in red lines Fig. 2.

The tenth part of my invention relates to the use of hand tools subsequent to the operation of the parts of the machine above described for the purpose of removing the sharp edge on the shoulder, and if the plug is for a swing, to cut a groove for a gas way around its periphery. For this purpose it is necessary to have a hand tool rest, and this part of my said invention consists in combining with the spindle and chuck and main bed A, a hand rest, adjustable in a stock mounted on a swinging frame hinged on the front side of the main bed so that it may be thrown out when not required, by hand, or by a motion from some other part of the machine, I call as a whole, a hinged hand rest.

Letter L represents the hand tool rest, $L^1$ its stock, $L^2$, set screw, $L^3$ the swinging frame sustained by the bolt $L^4$, which turns in a vertical bearing in a boss $L^5$, cast on the front of the bed A. There is sufficient play below the boss, $L^5$, to admit of the rest raising sufficiently to be released from the V flanch on the face of the bed A, on which it rests, a corresponding V groove being cut in the swinging frame, under the stock at $L^6$. The weight of the swinging frame is sufficient to hold it firmly when in place. The mode of raising it and throwing it out and back during the operation of the machine has been explained in connection with the sliding carriage. It is a very useful adjunct to the machine, if only to assist the operator in chucking the plug, and as arranged does not interfere with the regular operations of the machine.

The eleventh part of my invention consists in the arrangement in combination with the spindle and chuck of an internal sliding mandrel and drill for the purpose of marking a back center on the thumb piece of the plug so that it may readily be chucked in another machine to be ground. The spindle B is made hollow for this purpose and its axis is occupied by the sliding mandrel M which carries on its end a small drill which extends far enough in the chuck to about touch the end of the thumb piece as represented in Fig. 8. The mandrel M, is prevented from turning by the lever $M^1$, which moves freely on a fixed fulcrum attached to the bed A, and connects the mandrel with the long sliding rod $M^2$, which slides horizontally in eyes on the main bed, and extends to a little forward of the headstock where it is bent up and furnished with an adjustable toe $M^3$ kept against a stop $M^4$ by the action of the spring $M^5$. When the slide rests move forward the back slide rest strikes against the adjustable toe, which may be adjusted to take as much motion as necessary to make the center mark. The arrangement of belts necessary for the operation of the machine is shown in red lines in Fig. No. 1.

Letter Z represents the countershaft $Z^1$, a tight pulley which drives the spindle, $Z^2$, a tight pulley by which motion is communicated to the countershaft by a belt Y, from a main driving shaft, which belt is represented in the drawing as running on the loose pulley.

$Z^3$, $Z^4$, is a V grooved pulley loose on the shaft but fast to the loose pulley, $Z^3$, and when the loose pulley is driven is of course moved with it.

$Z^5$ and $Z^6$, are tight and loose pulleys driven by the cross band $Y^1$, from a main driving shaft. The belt is shown running on the loose pulley, $Z^6$, where it is always kept, by the action of the spring $Y^2$, on the shipper $Y^3$, except when necessary to reverse the motion of the spindle to run out the tap, which the operator does by moving the shipper—with the hand lever and holding it for an instant. There is a pin $Y^5$ on the belt shipper $Y^4$, which the lever $F^{17}$, connected with the treadle acts against to move the belt from the tight to the loose pulley, but not to bring it back—this the operator does with the hand lever $Y^6$.

$Z^7$ is a change V-grooved pulley fast to the counter-shaft, and drives the slide rests.

The operation of the machine in detail is as follows. The different cutting tools and their carriers are first properly adjusted to perform their respective operations successively on the sized plugs to be finished and the chuck properly adjusted to receive the thumb piece and hold it properly; the operator chucks the plug and centers it and then presses down the treadle with his foot. The system of levers connected with the treadle now acts to release the sliding carriage, arrest the motion of the spindle, by acting on the lever brake, shifts the driving belt from the tight pulley, $Z^2$, to the loose pulley, $Z^3$, on the countershaft, and raise up the hinged hand rest from its seat. The operator, still keeping the treadle pressed down with his foot, seizes the hand lever, and by it moves forward the sliding carriage toward the chucks, until it is arrested by the adjustable stop. The forward motion of the sliding carriage having as before explained thrown out the hinged hand rest there is nothing to interfere with the action of the tools sustained by it, and the operator now releases the treadle from the pressure of his foot which allows the spring connected with the system of levers to act, and the sliding bed is instantly clamped to the main beds as before explained, and the spindle released from the brake. The operator now sets the spindle in motion by moving the shipper Y⁴, by the hand lever, and then takes hold of the hand lever connected with the sliding mandrels in the reversible mandrel stock and presses the cutting tool H against the end of the plug, until the forward motion of the mandrel is arrested by the adjustable stop. He then moves back the mandrels, unlatches the mandrel stock and turns it 180°, or to its reverse position which brings the tap in line with the screw hole, and then moves forward the tap mandrel until arrested by the adjustable stop. He reverses the rotation of the spindle by shifting the belts with the hand levers and runs out the tap, shifts back the belts and then throws back the ball lever which as before explained sets in motion the automatic movement of the slide rests, which move once forward and back to form the taper part of the plug and then stop. He now presses down the treadle again, (this arrests the spindle and holds it firmly,) shifts the belt from the pulley, Z², to the loose pulley, Z³, setting in motion the grooved pulley, Z⁴, which communicates motion to the grooved clutch pulley on the cutting engine shaft, which is also thrown in gear, so as to communicate motion to the rotating cutters—still keeping his foot on the treadle he now moves back the sliding carriage to its first position by the hand lever and releases the treadle—as before explained, the back motion of the sliding carriage, by means of the adjustable hook arm behind brings the rotating cutters on the vibrating arm against the end of the plug to form the flat, and the front adjustable arm carries back the hinged hand rest to its seat. The subsequent operations by hand have been before described.

What I claim as my invention and desire to secure by Letters Patent is as follows, viz:

1. I claim constructing the main bearing surface of a lathe spindle entirely of sharp W grooves substantially as described.

2. In combination with a lathe spindle and belt shipper the friction brake substantially as described.

3. In combination with the chuck, the pins C⁶, slots, C⁷, and adjusting screws C⁸ substantially as described.

4. The arrangement in combination with the machine, of the sliding carriage, substantially as described.

5. The arrangement in combination with the machine of the system of levers in connection with the treadle and reacting spring substantially as described.

6. The arrangement of the parallel mandrels, G⁴, G⁵, in combination with the spindle and chuck and carrying a cutting and tapping tool substantially as described.

7. The arrangement, and mode of adjusting, the different parts of the cutting tool H, substantially as described.

8. The two slide rests in combination with each other and with the machine substantially as described and substantially for the purposes hereinbefore set forth.

9. In combination with the spindle, brake, and lever operating the belt shipper, the arrangement of the vibrating arm and rotating cutters, substantially as described.

10. The combination of the vibrating arm with the sliding carriage.

11. The hinged hand rest in combination with the spindle and bed A substantially is described.

12. The combination of the hinged hand rest with the sliding carriage and treadle lever substantially as described.

13. The arrangement of the internal mandrel and drill in combination with the spindle and chuck substantially as described.

14. The combination of the internal mandrel and drill, with the back slide rest substantially as described.

15. And finally I claim, in connection with a spindle and chuck suitable for holding the cast plug and so arranged with relation to the motive power, as to be rotated in reverse directions or be held firmly in a fixed position, the cutting tool H, and tap, the cutting tools I, I¹, and the vibrating rotating cutter or cutters, or their equivalents when arranged substantially as described so as to successively perform their respective parts of the operation of finishing the plug without removing it from the chuck, and to repeat their operations upon each successive plug substantially as described.

JAS. W. LYON.

Witnesses:
RICHARD J. CUNNINGHAM,
WM. K. WHITEHEAD.